(12) United States Patent
Vu (10) Patent No.: US 7,561,964 B2
(45) Date of Patent: Jul. 14, 2009

(54) OFF-ROUTE RECALCULATION METHOD AND APPARATUS FOR NAVIGATION SYSTEM

(75) Inventor: Tien Vu, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 568 days.

(21) Appl. No.: 11/326,184

(22) Filed: Jan. 5, 2006

(65) Prior Publication Data

US 2007/0156334 A1 Jul. 5, 2007

(51) Int. Cl.
*G01C 21/30* (2006.01)
*G01C 21/32* (2006.01)

(52) U.S. Cl. ............... 701/210; 701/200; 701/201; 701/202; 701/203; 701/204; 701/205; 701/206; 701/213

(58) Field of Classification Search ......... 701/200–224; 340/988–996
See application file for complete search history.

(56) References Cited

U.S. PATENT DOCUMENTS

| | | | |
|---|---|---|---|
| 5,067,082 A | * | 11/1991 | Nimura et al. ............ 701/208 |
| 5,262,775 A | | 11/1993 | Tamai et al. |
| 5,774,071 A | * | 6/1998 | Konishi et al. ............ 340/988 |
| 6,026,346 A | * | 2/2000 | Ohashi et al. ............ 701/210 |
| 6,064,941 A | * | 5/2000 | Nimura et al. ............ 701/210 |
| 6,665,610 B1 | * | 12/2003 | Correia et al. ............ 701/209 |
| 6,807,483 B1 | * | 10/2004 | Chao et al. ............ 701/210 |

* cited by examiner

*Primary Examiner*—Khoi Tran
*Assistant Examiner*—Bhavesh V Amin
(74) *Attorney, Agent, or Firm*—Muramatsu & Associates (57) ABSTRACT

An off-route recalculation method and apparatus for a navigation system calculates a new route when a vehicle is deviated from an originally calculated route to a destination. The method is comprised of the steps of: detecting whether a user vehicle has deviated from an originally calculated route; predicting a path that a user is likely to take until a new route to the destination is calculated; calculating a predicted distance that the user vehicle advances through the predicted path during a time the new route to the destination is calculated and during a turn prepare time, thereby determining a start position of the new route; calculating the new route to the destination incorporating the start position.

16 Claims, 9 Drawing Sheets

| Distance | Complexity | Estimated time |
|---|---|---|
| 0 - 3 mile | low | 1.0 sec |
| | high | 1.2 sec |
| 3 - 9 mile | low | 1.3 sec |
| | high | 1.5 sec |
| 9 - 15 mile | low | 1.9 sec |
| | high | 2.2 sec |
| 15 - 23 mile | low | 2.3 sec |
| | high | 2.5 sec |
| 23 - 30 mile | low | 2.8 sec |
| | high | 3.0 sec |
| 30 - 40 mile | low | 3.3 sec |
| | high | 3.6 sec |
| 40 - 54 mile | low | 3.9 sec |
| | high | 4.1 sec |
| 54 - 66 mile | low | 4.3 sec |
| | high | 4.5 sec |

OFF-ROUTE RECALCULATION METHOD AND APPARATUS FOR NAVIGATION SYSTEM

FIELD OF THE INVENTION

This invention relates to an off-route recalculation method and apparatus for a navigation system to be used when a vehicle is deviated from a calculated route to a destination, and more particularly, to an off-route recalculation method and apparatus for a navigation system for recalculating a new route to the destination by incorporating an estimated road and an estimated distance that the vehicle would have moved at the end of the recalculation including a distance corresponding to a sufficient turn prepare time for achieving safe driving and efficient travel to the destination.

BACKGROUND OF THE INVENTION

A navigation system performs travel guidance for enabling a user to easily and quickly reach the selected destination. A typical example is a vehicle navigation system where a vehicle carries a navigation function. Such a navigation system detects the position of the user or user's vehicle, and reads out map data pertaining to an area at the current vehicle position from a data storage medium in the navigation system. The navigation system displays a map image on a monitor screen while superimposing a mark representing the current location of the user on the map image. When a destination is set, the navigation system starts a route guidance function for setting a guided route from the start point to the destination and guides the user to the destination.

Figure 1A:
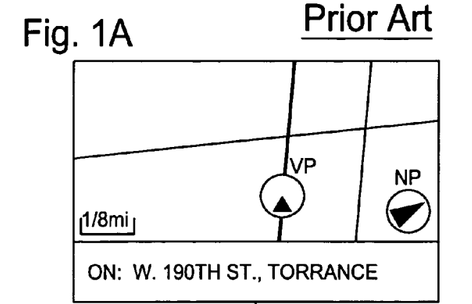
FIGS. 1A-1H are schematic diagrams showing an example of process and screen display of a navigation system for specifying a destination, determining a route to the destination, and guiding a user to the destination.
Figure 1B:
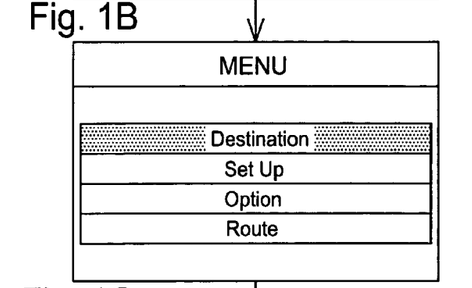

FIGS. 1A-1H show an example of overall procedure and screen display involved in the navigation system. FIG. 1A shows an example of locator map screen of the navigation system typically used when the destination is not specified. The navigation system displays a street on which the vehicle (current vehicle position VP) is running on a map image and a name of the street. Other information such as a north pointer NP, a map scale and a current time may also be illustrated on the display screen.

Figure 1C:
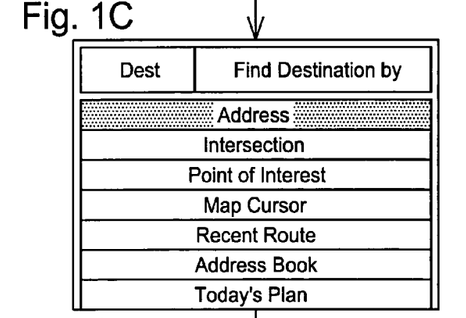
Figure 1D:
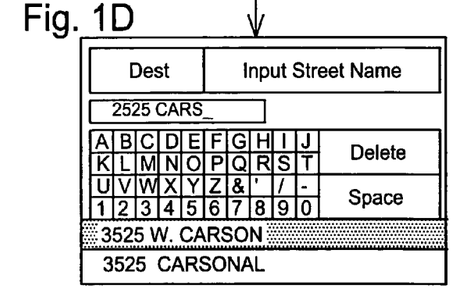
Figure 1E:
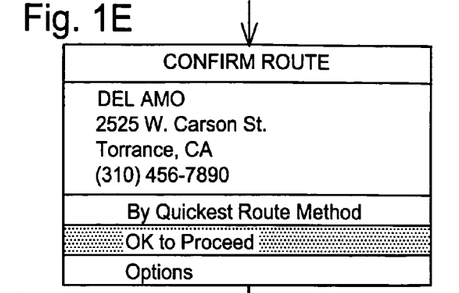

FIGS. 1B-1F show an example of process for specifying a destination in the navigation system. When selecting a "Destination" menu on a main menu screen of FIG. 1B, the navigation system displays an "Find Destination By" screen as shown in FIG. 1C listing various method for selecting the destination. When selecting, for example, the "Address" method, the navigation system displays a keyboard screen in FIG. D. Suppose the user inputs a particular address, the navigation system displays a "Confirm Destination" screen such as shown in FIG. 1E. If the name and address on the screen shows the correct destination, the user enters an "OK to Proceed" key to proceed to the next procedure.

Figure 1F:
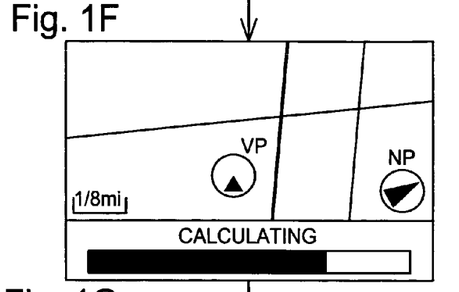
Figure 1G:
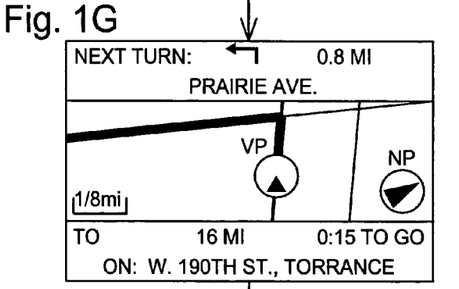

In FIG. 1F, the navigation system calculates and determines a route to the destination, i.e., the specified address. The navigation system determines a route to the destination based on, for example, the quickest way to reach the destination, the route using many free ways as possible or the route without using toll road, and the like. Once the route to the destination is determined, the navigation system starts the route guidance as shown in FIG. 1G for guiding the user to the destination. Typically, the navigation system shows the intersection to show the next turn and a direction of the turn. Such route guidance by the navigation system is also accompanied by voice instructions.

Figure 1H:
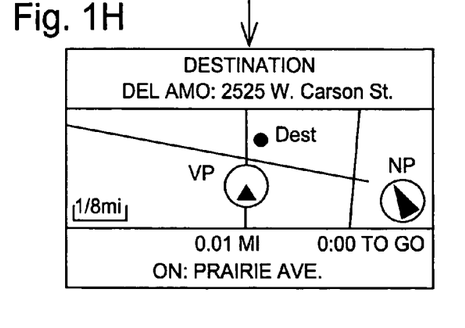

The navigation system measures a distance to the current destination to detect whether the destination is within a predetermined range such as 100 meters. When the user approaches the destination within such a predetermined distance, the navigation system indicates that the destination "Dest" is ahead as shown in FIG. 1H. The navigation system detects the actual arrival based on various factors such as the engine stop.

Figure 2A:
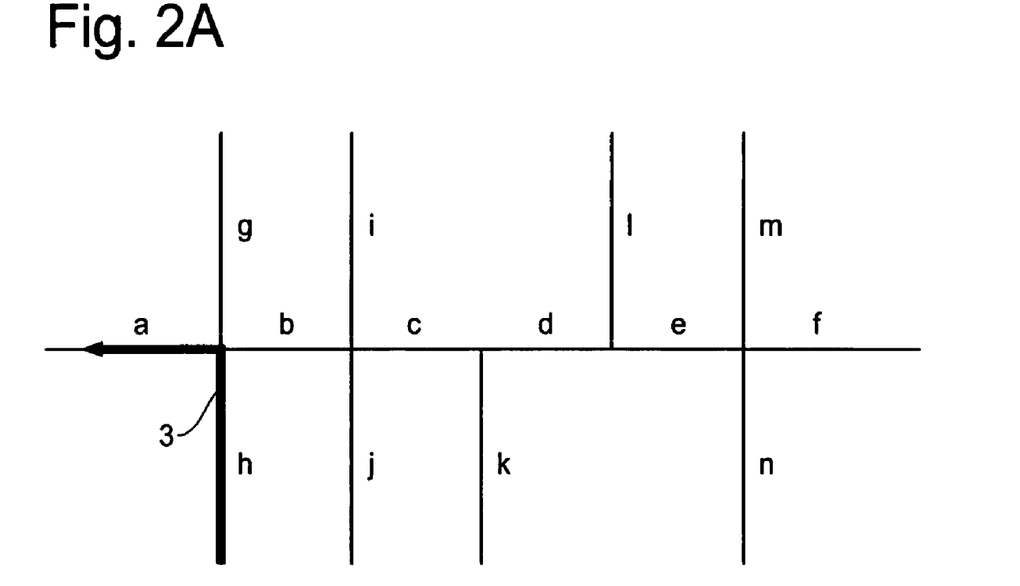
FIGS. 2A-2C are schematic diagrams showing situations that require route recalculation due to the deviation of the vehicle from an originally calculated route to the destination.

The user can reach the destination by following the calculated route obtained by the navigation system. A problem arises when the user fails to follow the calculated route. FIG. 2A is a schematic diagram showing a calculated route to be followed to the destination. The alphabet letters indicate various road segments involved in the surrounding area of the calculated route. In this example, the user is supposed to drive along the road segment "h" and then make a left turn to the road segment "a" to stay on the calculated route.

Figure 2B:
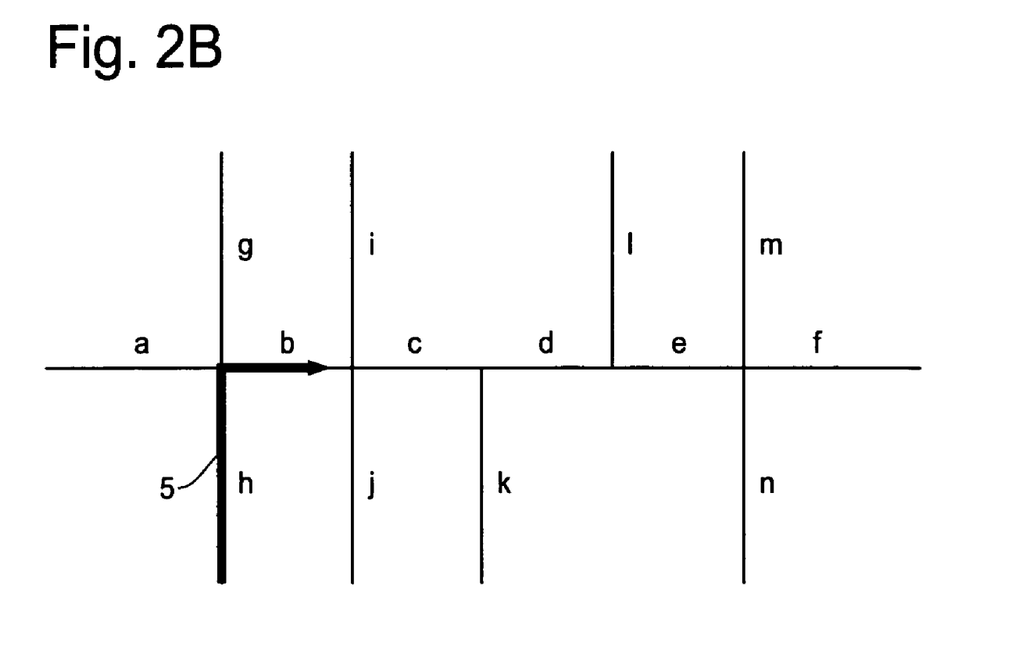

FIG. 2B is a schematic diagram showing a condition when the user fails to follow the calculated route by making a right turn to enter the road segment "b". The navigation system generally has an off-route detection mechanism that detects when the vehicle has deviated from the calculated route to the destination. If the off-route detection mechanism has determined that the vehicle has deviated from the calculated route, i.e., off-route, the navigation system starts a recalculation process to create a new route to the destination.

Figure 2C:
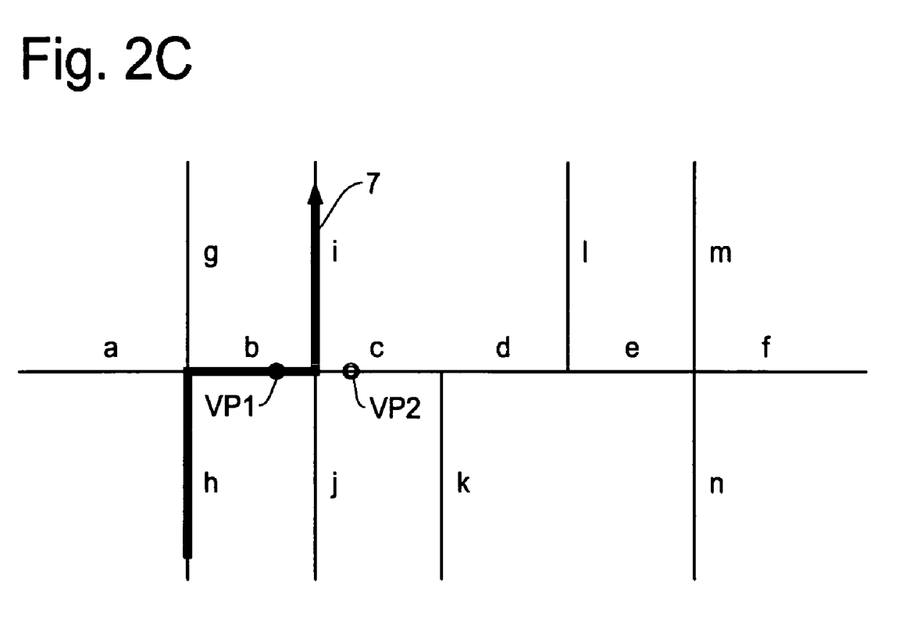

However, the recalculation may not always result in a safe and accurate route to the destination. Referring to FIG. 2C, the schematic diagram shows a condition where the new route is calculated but a maneuver by the user for taking the new route is problematic. For example, it is assumed that the navigation system has calculated a route which goes from the road segment "b" and then to the road segment "i". However, if the navigation system finishes the route calculation when the vehicle is located at the position indicated by VP1 and guides the user for the new route, the user may not have a sufficient time to maneuver the vehicle to make a left turn to take the road segment "i" because the intersection is too close to the vehicle position. Even if the user could manage to enter into the road segment "i", the maneuver may force the user to make a hasty and unsafe move to make the left turn.

Moreover, there is also a problem that the navigation system may continuously perform recalculation for a new route if the vehicles has passed a new maneuver point before the navigation system recalculates the new route. For instance, referring to FIG. 2C, if the navigation system recalculates a new route that prompts the user to make a left turn to the segment "i" but the vehicle has already passed the turning point and is now located at VP2 on the segment "c", the recalculated route becomes useless and the navigation system starts to recalculate again to find a new route. In a worst case scenario, the navigation system may keep repeating recalculation for a new route, thus, no route guidance is provided to the user for a long period of time.

If the navigation system is to take a maneuver point that is too distanced from the present vehicle location, the above-noted problem of repeated recalculation may be prevented. However, the chance of traveling an inefficient route is increased. Moreover, the farther the maneuver point is set, the more difficult it becomes to predict whether the vehicle will actually come to the maneuver point. Thus, there is a need of a new method which can efficiently recalculate a new route when the vehicle has deviated from the calculated route.

SUMMARY OF THE INVENTION

It is, therefore, an object of the present invention to provide an off-route recalculation method and apparatus for a navigation system to determine a new route to the destination when a vehicle is deviated from an originally calculated route to the destination.

It is another object of the present invention to provide an off-route recalculation method and apparatus for a navigation system for recalculating a new route to the destination by incorporating a predicted road and a predicted distance that the vehicle would have moved at the end of the recalculation including a distance for a sufficient turn prepare time for achieving safe and efficient driving to the destination.

It is a further object of the present invention to provide an off-route recalculation method and apparatus for a navigation system for recalculating a new route to the destination by updating data regarding estimated calculation time in a look-up table to determine a projection distance reflecting a turn prepare time with high accuracy.

One aspect of the present invention is a method for recalculating a route to the destination when a vehicle has deviated from an originally calculated route. The method is comprised of the steps of detecting whether a user has deviated from an originally calculated route to a destination; predicting a path that a user is likely to take after the user has deviated from the original route until a new route to the destination is calculated by examining data regarding road segments retrieved from a map data storage; calculating an estimated distance that the user advances through the predicted path during a time the new route to the destination is calculated and a turn prepare time, thereby determining a start position of a new route to the destination; and calculating a new route to the destination incorporating the start position so that the new route allows the user a sufficient time for next turn maneuver while enabling to quickly reach the destination.

The method of the present invention further includes a step of starting route guidance for the new route as soon as the calculation for the new route is completed so as to give the user a time equal to or greater than the turn prepare time before the next turn maneuver.

In the present invention, the step of predicting the path includes a step of comparing angles formed by the road segments. Further, the step of predicting the path includes a step of comparing road names assigned to the road segments. Furthermore, the step of predicting the path includes a step of comparing function classes of the road segments.

The estimated distance is calculated by the following formula:

$$D=(ECT+TPT)*AVS$$

where D denotes the estimated distance, ECT denotes an estimated calculation time which is a time required for producing a new calculated route to the destination, TPT denotes a turn prepare time which is a time length appropriate for the user to prepare for turning at a next intersection, and AVS denotes an average vehicle speed.

The estimated calculation time is a predefined value set by a manufacturer or a value that is obtained by an experimental calculation operation. The estimated calculation time is renewed by a value obtained by an experimental calculation operation or a value obtained by an actual route calculation operation. The turn prepare time is adjustable by the user.

Another aspect of the present invention is an apparatus for recalculating a route to the destination when the vehicle is deviated from the originally calculate route. The apparatus of the present invention is designed to implement the various steps of the method for recalculating the new route to the destination by incorporating the predicted road and the predicted distance for achieving safe and efficient driving to the destination.

According to the present invention, the off-route recalculation method and apparatus is able to effectively recalculate the new route when the vehicle has deviated from the original guided route. The route recalculation method of the present invention can avoid continuous recalculation and dangerous maneuvering by obtaining an optimum start point in recalculating a new route. Since the start point of the new route is determined by incorporating a distance that corresponds to the turn prepare time, the method of the present invention enables to achieve safe driving and efficient travel to the destination.

DETAILED DESCRIPTION OF THE INVENTION

The present invention provides an off-route recalculation method and apparatus that enables to create a new route to the destination when the user fails to follow the originally calculated route to the destination. The present invention predicts the path that the user is most likely to take and also predicts a distance the user is likely to travel by the time the new route is calculated. In the present invention, the predicted distance includes a distance required for a sufficient turn prepare time for the user. Thus, the navigation system of the present invention creates a new route incorporating the estimated path and distance so that the new route allows an enough time for the user to turn at the next intersection while efficiently guiding the user to the destination.

Figure 3:
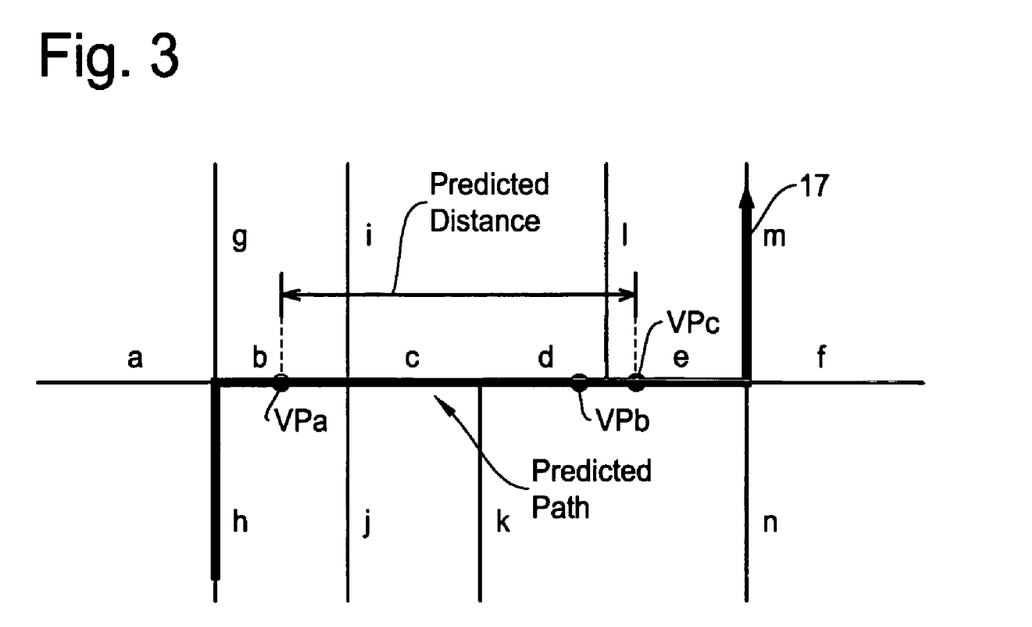
FIG. 3 is a schematic diagram showing a basic principle of operation involved in the route recalculation method and apparatus of the present invention.

The off-route recalculation method in the present invention is explained with reference to the accompanying drawings. FIG. 3 is a schematic diagram showing a basic principle of operation in the route recalculation method and apparatus of the present invention for the same road situation as that of FIGS. 2A-2C. The method and apparatus of the present invention predicts a route that the user is most likely to take during the recalculation process and a distance of the user at the time the recalculation is completed in addition to a distance corresponding to a turn prepare time.

In other words, within the context of the present invention, a predicted (projection) distance is a sum of a distance that the user advances by the end of the recalculation and a distance corresponding to a turn prepare time for the user. In the present invention, although the route guidance for the new route starts as soon as the recalculation is completed, the new route is constructed at the end of the predicted distance as a start point. Thus, intersections located within the distance less than the turn prepare time are excluded from the new route. Consequently, the method and apparatus of the present invention determines a new route which is most suitable for the user in terms of efficiency to the destination as well as safe driving.

FIG. 3 shows a situation where, rather than the road segment "a" which is in the originally calculated route, the user takes the road segment "b" through an error or other reasons. The navigation system detects that the vehicle is now deviated from the calculated route and the navigation system starts the recalculation process. Suppose the recalculation process starts when the vehicle is located at a vehicle position VPa, the off-route recalculation method and apparatus of the present invention predicts a path that the user most likely to take when no route guidance is provided during the recalculation time.

The off-route recalculation method and apparatus also predicts a distance between the vehicle position VPa and a new route start position VPc. As noted above, the predicted distance includes not only the vehicle position VPb at the end of the recalculation but also includes a distance required for the turn prepare time for the user. Thus, in FIG. 3, the navigation system is able to complete the recalculation and start the route guidance for the new route at the estimated vehicle position VPb. However, the new route to the destination starts from the position VPc, i.e., the road segment "l" is not included in the new route. Therefore, the user can enjoy a sufficient turn prepare time to turn at the road segment "m".

To estimate the path, the off-route recalculation method and apparatus weighs road attributes such as road names, angles of the roads, classes of the road, etc. To estimate the distance, the off-route recalculation method and apparatus considers the speed of the vehicle, estimated calculation time, past record of the calculation time, etc. As noted above, the off-route recalculation method and apparatus determines a new route by further considering a time required for a user to prepare for the turn (turn prepare time) before an intersection. Namely, the newly calculated route to the destination allows the user to have at least the turn prepare time when the new route is displayed or announced by the navigation system.

Thus, in the example of FIG. 3, the off-route recalculation method and apparatus predicts that the user takes the road segments "b", "c" and "d" during the recalculation. Since the off-route recalculation method and apparatus has predicted the distance between the vehicle positions VPa to VPb, the road segments "i", "j", "k" are removed from candidates for the next turn. Further, the road segment "l" will be removed from the new route since it is too close to the predicted vehicle position VPb, because a sufficient turn prepare time is unavailable. Accordingly, the new route to the destination is configured as a start point VPc (end of the predicted distance) to guide the user to turn at the road segment "m" as shown in FIG. 3. Consequently, the off-route recalculation method and apparatus of the present invention is able to provide a new route that is efficient to reach the destination while maintaining the safe driving.

Figure 4:
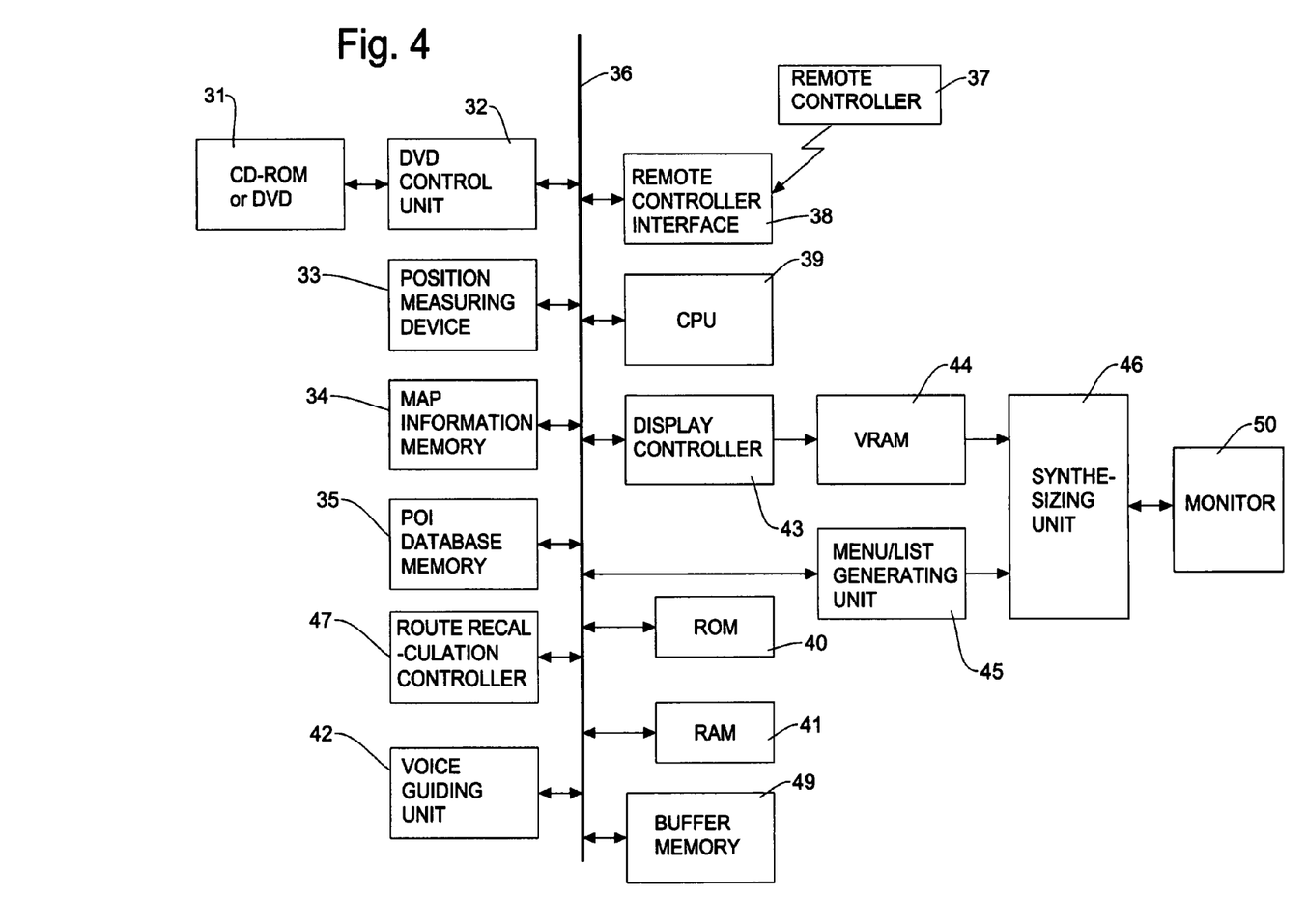
FIG. 4 is a block diagram showing an example of structure of a vehicle navigation system implementing the present invention for recalculating a route to the destination when the vehicle is deviated from the originally calculated route.

FIG. 4 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop or notebook computer.

In the block diagram, the navigation system includes a map storage medium 31 such as a CD-ROM, DVD, hard disc or other storage means (Hereafter "DVD") for storing map information. Alternatively, such map data can be provided to the user from a remote server through a communication network such as Internet. The navigation system includes a DVD control unit 32 for a controlling an operation for reading the map information from the DVD, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (Global Positioning System) receiver, and etc.

The block diagram of FIG. 4 further includes a map information memory 34 for storing the map information which is read from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

In FIG. 4, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a voice interface and guiding unit 42 for voice communication interface and spoken instructions, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, and a monitor (display) 50.

A route recalculation controller 47 and a buffer memory 49 perform a function of the present invention for recalculating a new route to the destination when the vehicle has been deviated from the originally calculated route to the destination. The route recalculation controller 47 is notified that the vehicle is now in the off-route condition and starts the route recalculation process. The route recalculation controller 47 estimates roads that the user most likely takes during the recalculation process since no route guidance is provided during that time. The route recalculation controller 47 also estimates the distance that the user advances by the end of the recalculation process. The information useful for such estimation will be stored in the buffer memory 49 as in the form of, for example, a look-up table. Thus, the off-route recalculation method and apparatus of the present invention is able to provide a new route which is most suitable for the user in terms of efficiency to the destination as well as safe driving.

Figure 5:
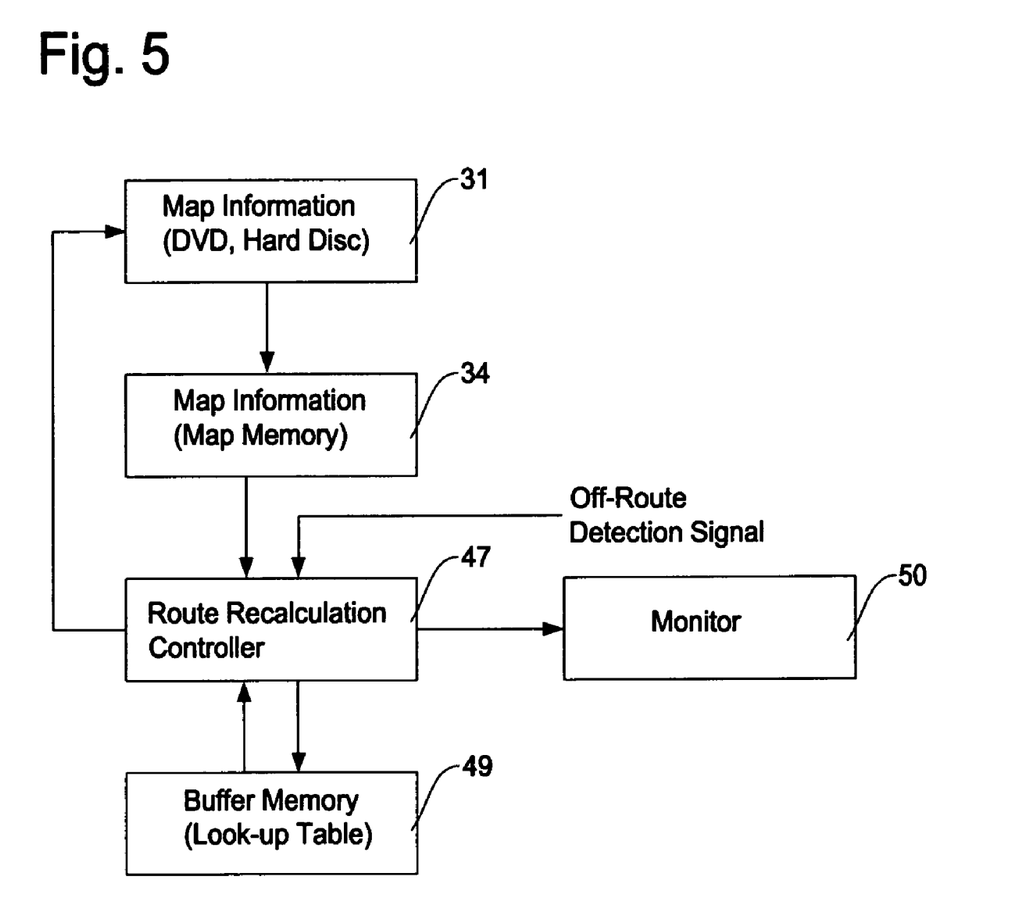
FIG. 5 is a block diagram showing an essential part of the navigation system of the present invention for recalculating a route to the destination when the vehicle is deviated from the originally calculated route.

FIG. 5 shows an example of simplified structure of the navigation system for performing the off-route recalculation in accordance with the present invention. In this block diagram, the components in the structure of FIG. 4 which are directly involved in the off-route recalculation operation are shown for illustrating the essential structure of the present invention. The apparatus of FIG. 5 includes s map storage medium 31 such as a DVD or hard disc, a map information memory 34, a route recalculation position controller 47, a buffer memory 49 and a monitor 50. The route recalculation controller 47 can be a part of CPU 39 or a separate microprocessor.

The map storage medium 31 stores the map information encompassing, for example, all over the country. The map memory 34 extracts the map information from the map storage medium 31 repeatedly by an amount necessary for processing the map information such as a predetermined number of street segment data for traveling along the route to a destination. An image based on the map information is displayed on the monitor 50 during a route guidance process.

During the route guidance, if the user or user's vehicle deviates from the calculated route to the destination, the route recalculation controller 47 receives an off-route detection signal. The route recalculation controller 47 estimates a path that the user most likely takes during the recalculation process since no route guidance is provided during that time. The route recalculation controller 47 also estimates the distance (projection distance) to the start point of the new route to the destination.

The projection distance is a sum of a distance to the position where the user advances by the end of the recalculation process and a distance to the position where the user advances during a turn prepare time. The former distance is a product of an estimated recalculation time and the vehicle average speed. The latter distance is a product of a turn prepare time and the vehicle average speed. The route calculation controller 47 retrieves the information regarding the estimated calculation time from a look-up table in the buffer memory 49 and multiplies the estimated recalculation time by the vehicle speed. The turn prepare time can be preset in the navigation system or can be set by the user to reflect the user's preference.

Based on the projection distance, the route calculation controller 47 estimates the location of the user at the end of the route recalculation and the location of the start point of the new route. The route recalculation controller 47 creates a new route from the start point and starts the route guidance. Since the start point of the new route is away from the vehicle position at the end of the recalculation by a distance corresponding to the turn prepare time, the new route allows a sufficient time for the user to turn at an intersection. Thus, the off-route recalculation method and apparatus of the present invention is able to provide a new route which is most suitable for the user in terms of efficiency to the destination as well as safe driving.

Figure 6A:
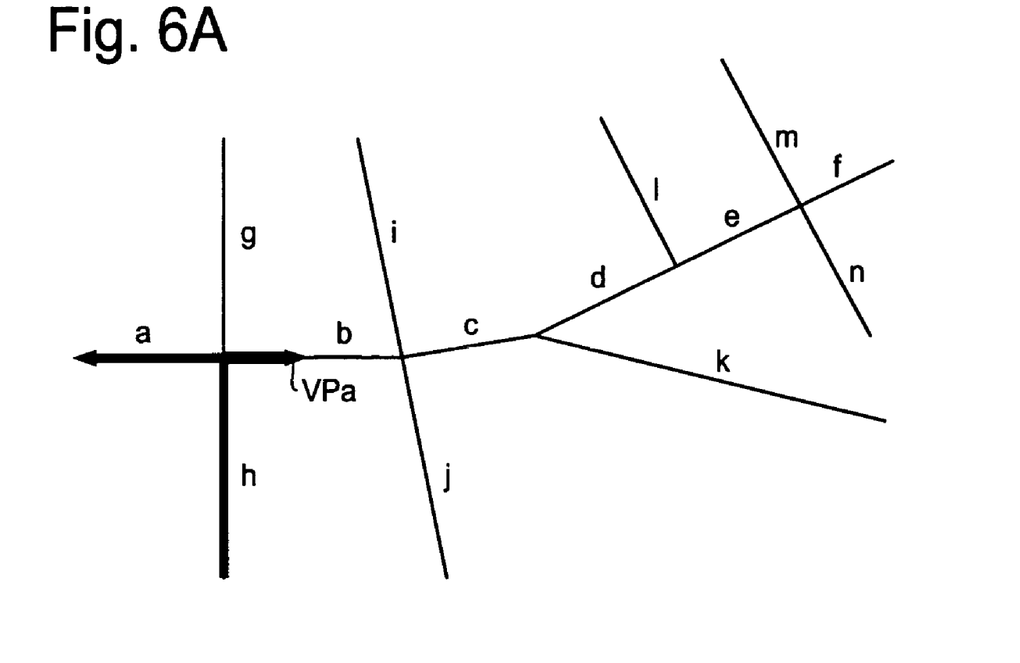
FIGS. 6A and 6B are schematic diagrams showing an example of road segments for explaining a concept of the present invention for determining a predicted path and a predicted distance.
Figure 6B:
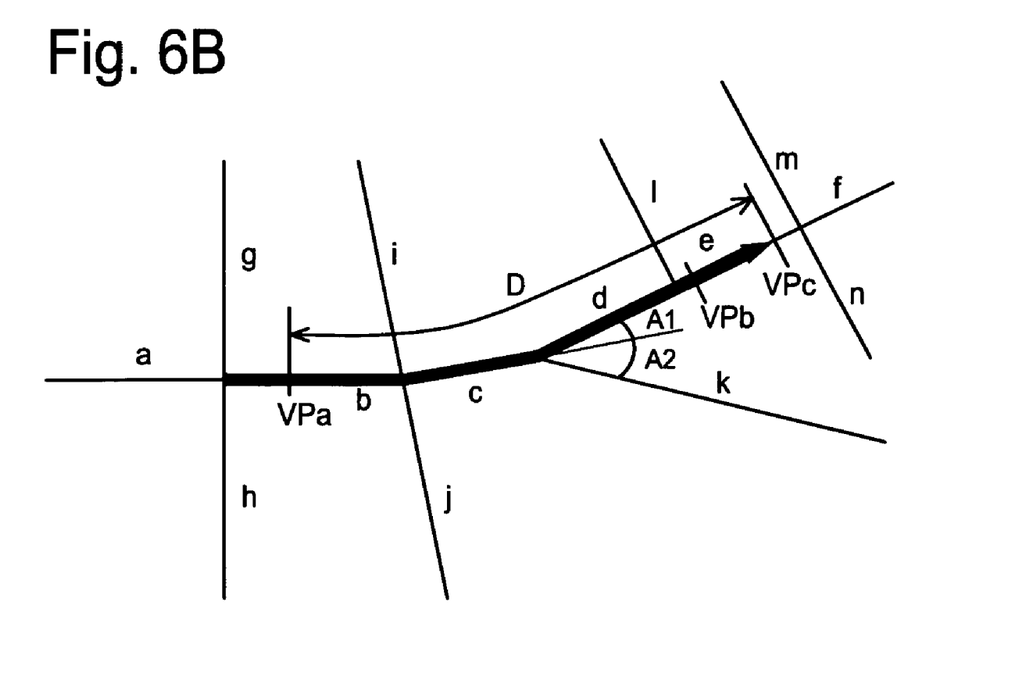

FIGS. 6A and 6B are schematic diagrams showing the off-route recalculation method and apparatus of the present invention for predicting a path that the user is most likely to take when no route guidance is provided and a distance that the user moves by the end of the recalculation time and the turn prepare time. FIGS. 6A and 6B shows a situation where the user takes the road segment "b" rather than taking the road segment "a" which is in the originally calculated route. The navigation system detects that the vehicle is now deviated from the calculated route and starts the recalculation process.

Suppose the recalculation process starts when the vehicle is located at a vehicle position VPa as shown in FIG. 6B, the off-route recalculation method and apparatus predicts a path that the user is most likely to take when no route guidance is provided during the recalculation time. In this example, the off-route recalculation method and apparatus predicts that the user will take the road segments "b", "c", "d" and "e" during the recalculation process. The off-route recalculation method and apparatus also predicts a distance "D" (projection distance) between the vehicle position VPa and a position VPc which is a start position of the new route to the destination. As noted above, the projection distance D is a sum of a distance to the position VPb where the user advances by the end of the recalculation process and a distance to the position VPc where the user advances during a turn prepare time.

To predict the path that the user (vehicle) is likely to take, the present invention will examine such factors as an angle of road, road name, and road function class. The angle refers to the angle between current road segment to the next road segment. In the example of FIGS. 6A and 6B, the angle A1 between the current road segment "c" and the next possible road segment "d" is A1 and the angle A1 between the current road segment "c" and the next possible road segment "k" is A2. The method of the present invention compares the angles A1 and A2, and since the angle A1 is smaller than the angle A2, it estimates that the user will take the road segment "d". However, if the difference of the angles is small, the method of the present invention also considers other factors described below.

Generally, with respect to the angles, the priority is given to the road segment that causes a smallest change in the angle of the route. Thus, in the case of FIGS. 6A and 6B where the road segment "b" connects to three other road segments "i", "j", and "c", respectively, the present invention compares the angles of the road segments. Namely, the navigation system will check the angle between the road segment "b" and "i", the angle between "b" and "j", and the angle between "b" and "c" to find out which angle is the smallest.

In this case, the road segment "c" is selected because the angle between the road segment "b" and "c" is the smallest. Typically, the longitude and latitude data at each end of the road segment are provided in the map data, the off-route calculation method and apparatus of the present invention can retrieve the data and compare the angles of the roads in the above noted process. If the difference between the angles is insignificant, the present invention considers other factors as well as will be described later.

The route name refers to a name of street such as "Palm Drive" assigned to a particular street and such information is stored in the map database of the navigation system. The present invention estimates that the user will proceed the same street when the route guidance is not provided. Thus, comparing the route names of the road segments "i", "c", and "j", the navigation system determines that since the route names of the road segments "b" and "c" are identical, the road segment "c" is selected as the path that the user is most likely to take.

The road function class refers to a type of road or a level of road. For example, interstate freeways may be assigned to class 1, other types of freeway may be assigned to class 2, large streets may be assigned to class 3, and residential streets may be assigned to class 4. Several other types of road function classes are also possible. Because the user is likely to take the same type of street, the present invention estimates that the user will proceed the road segments of the same function class when the route guidance is not provided. For example, assuming that the road segments "a", "b", "c", "d", "e" and "f" are assigned as class 3 and other road segments are assigned are assigned as class 4, then the route that has the road segments "a", "b", "c", "d", "e" and "f" are selected as a predicted path that the user is likely to take.

Those three methods of predicting the path may be used in combination or separately from one another. If the road segment angles do not differ very much, the route segment angle method may not be effective as in the case between road segments "c" and "d" (angle A1) and between segments "c" and "k" (angle A2). In such a case, the navigation system may also consider the route name and the road function class in addition to the road angles to predict the path. Similarly, if all the road segments have the same road function class, other methods of predicting the path are also used.

In determining the position VPb of the user at the time the route recalculation process completes, the navigation system calculates a distance between the present vehicle location VPa and the predicted vehicle position VPb. Based on the estimated position VPb of the user, the off-route calculation method and apparatus of the present invention produces a new calculated route that allows a user a sufficient maneuvering (time turn prepare time). The new route is created by incorporating the turn prepare time needed for the user, i.e., a distance to the position VPc that the user advances during the turn prepare time. Namely, the new route is configured by the start position VPc by adding the distance between the predicted vehicle position VPb to the position VPc proportional to the turn prepare time. Thus, within the context of the present invention, the projection distance D is a distance between the positions VPa and VPc which can be expressed in the following equation:

$$D=(ECT+TPT)*AVS$$

where ECT denotes the estimated calculation time, TPT denotes the turn prepare time, and AVS denotes the average vehicle speed.

Figure 7:
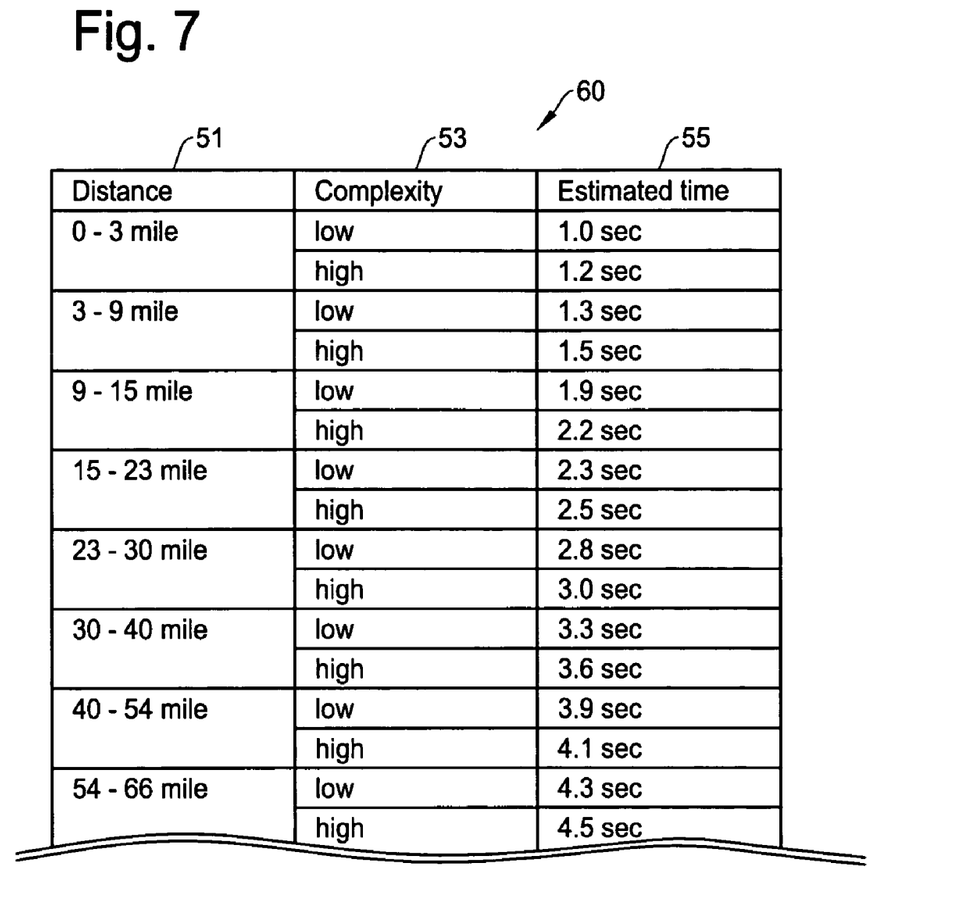
FIG. 7 shows an example of data in a look-up table for estimating a route recalculation time based on distance to the destination and condition of navigation system under the present invention for determining the predicted distance and a new route start position.

The estimated calculation time (ECT) depends on the hardware used in calculating the new route, type of job the navigation system is performing, calculation setting, the distance to the destination, complexity of route, etc. In the preferred embodiment, precompiled data for the estimated calculation time is stored in the navigation system. The precompiled data for the estimated calculation time (ECT) may be in the form of a look-up table as shown in FIG. 7 that is based on the route distance and the characteristics of the navigation system. The initial values of estimated calculation times in the look-up table may be set by a manufacturer of the navigation system.

In FIG. 7, a look-up table 60 includes a distance column 51, a complexity column 53, an estimated calculation time column 55. The look-up table may be established in the buffer memory 49 in FIGS. 4 and 5. From the look-up table 60, an estimated calculation time is obtained by the distance to the destination and the complexity of calculation. The complexity of calculation is high when the user wants to avoid a particular location or road or when the calculation speed of a process of the navigation system is not very high because, for example, types of other jobs performing. Preferably, the data in the look-up table 60 will be renewed by the most recent actual calculation time because the calculation power of the CPU in the navigation system is changing based on the current jobs.

In the look-up table 60, when the distance to a destination is 20 miles and the calculation is complex (high complexity), then the estimated calculation time is 2.5 seconds. As noted above, the data in the look-up table 60 are merely an example, and other factors such as a search setting (avoiding a certain type of road, etc), hardware status (how busy the CPU that calculates the route, etc), complexity of a route, etc., may change the data in the look-up table.

In the preferred embodiment, the navigation system creates a sample of calculation time for the look-up table 60. For instance, the navigation system may automatically experiments to see how long a time a calculation process takes. It may take actual route calculation times that have been performed recently as samples, or the navigation system may automatically creates a sample for an arbitrarily selected starting point to a destination point. By creating samples of calculation time data, the navigation system can adjust the estimated calculation time (ECT) to accurately estimate the time required for recalculation.

The turn prepare time (TPT) represents the time required for a driver to maneuver the vehicle to follow the recalculated route. For example, if it is determined that the average time the user requires to maneuver the vehicle to follow a guided route is 10 seconds, the TPT will be set to 10 seconds. TPT may be a predefined time selected by a manufacturer of a navigation system. It is also be possible to allow the user to enter a preferable TPT to accommodate the user's driving habit and skill.

The sum of the time of ECT (estimated calculation time) and TPT (turn prepare time) is multiplied by the average vehicle speed (AVS) to obtain the projection distance D. The AVS may be obtained by taking an average speed right after the off-route detection of the vehicle. The AVS may also be obtained by accumulating average speed data for similarly situated traffic condition. The route guidance operation for the newly calculated route starts at the vehicle position VPb as soon as the recalculation completes. Since the new route is configured as the start position VPc which is a distance away from the vehicle position VPb, the user can enjoy a sufficient turn prepare time even though the new route requires the user to make a turn immediately after the position VPc.

Figure 8:
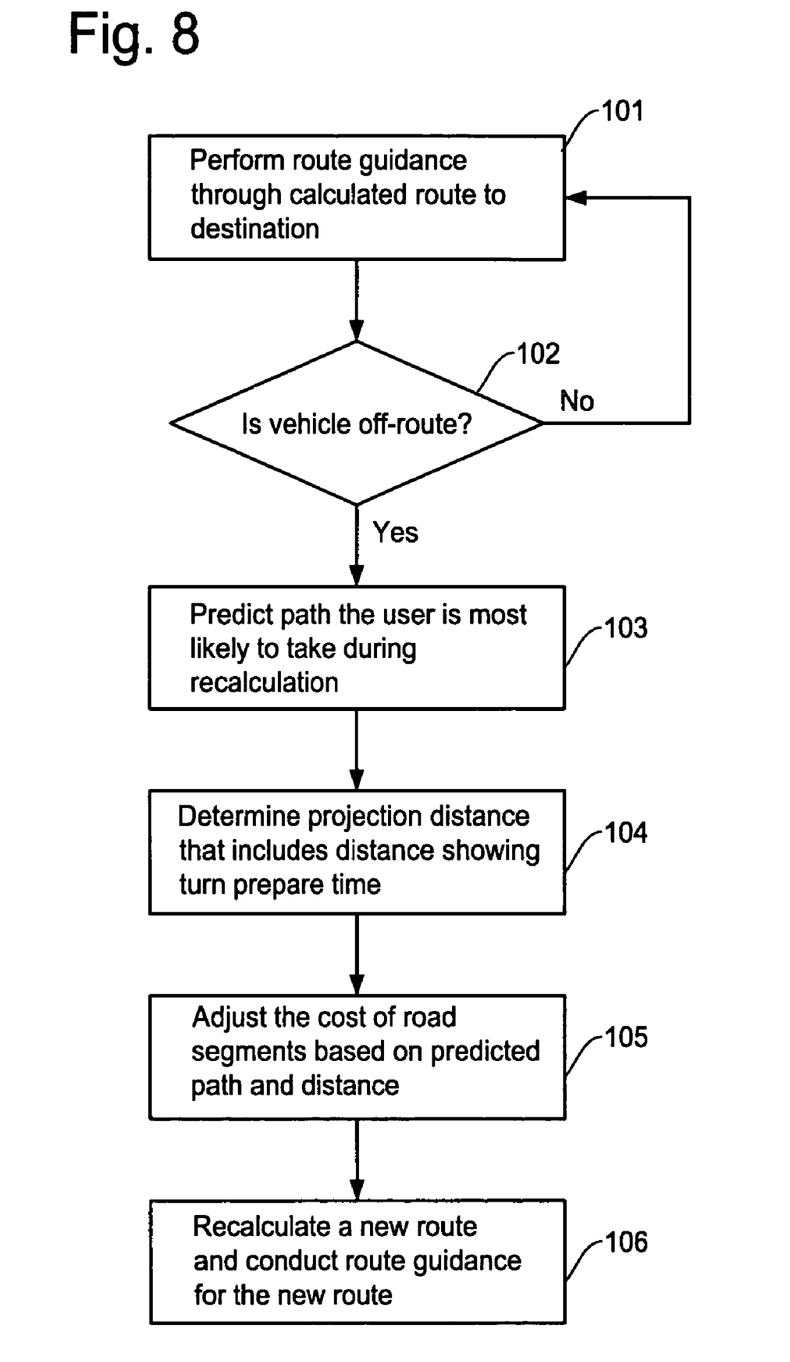
FIG. 8 is a flow chart showing an example of operation for recalculating a route in the present invention when the vehicle deviates from the originally calculated route to the destination.

Referring to the flow chart in FIG. 8, the steps of recalculating a route in a preferred embodiment under the present invention is described. In step 101, the navigation system performs the route guidance with respect to the originally calculated route to the destination. In step 102, the navigation system detects if the vehicle has deviated from the calculated route. The steps 101 and 102 will be repeated when the vehicle is following the calculated route to the destination.

If it is determined that the vehicle is off the calculated route, the navigation system will perform the path prediction at step 103. As described above, the navigation system predicts the path the user is most likely to take during the recalculation period by considering the angles between road segments, road name, and/or road function classes. Upon determining the path that the user is most likely to take, the navigation system will calculate a projection distance in step 104. As noted above, the projection distance is calculated based on the data regarding the estimated calculation time precompiled in the navigation system. As noted above, the projection distance includes a distance that corresponds to the turn prepare time. Based on the obtained data, the cost of the road segments is adjusted at step 105 to select the road segments to establish an efficient route to the destination. Based on such cost analysis, the navigation system will recalculate a new route to the destination in step 106.

As has been described above, according to the present invention, the off-route recalculation method and apparatus is able to effectively recalculate the new route when the vehicle has deviated from the original guided route. The route recalculation method of the present invention can avoid continuous recalculation and dangerous maneuvering by obtaining an optimum starting point in recalculating a new route. Since the start point of the new route is determined by incorporating a distance that corresponds to the turn prepare time, the method of the present invention enables to achieve safe driving and efficient travel to the destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of calculating a route to a destination, comprising the following steps of:
   detecting whether a user has deviated from an originally calculated route to a destination;
   predicting a path that a user is likely to take after the user has deviated from the original route until a new route to the destination is calculated by examining data regarding road segments retrieved from a map data storage;
   calculating a predicted distance that the user advances through the predicted path during a time the new route to the destination is calculated and a turn prepare time, thereby determining a start position of a new route to the destination; and
   calculating a new route to the destination incorporating the start position so that the new route allows the user a sufficient time for next turn maneuver while enabling to quickly reach the destination;
   wherein the predicted distance is calculated by the following formula:

$$D=(ECT+TPT)*AVS$$

where D denotes the predicted distance, ECT denotes an estimated calculation time which is a time required for producing a new calculated route to the destination, TPT denotes a turn prepare time which is a time length appropriate for the user to prepare for turning at a next intersection, and AVS denotes an average vehicle speed.

2. A method of recalculating a route to a destination as defined in claim 1, further comprising a step of starting route guidance for the new route as soon as the calculation for the new route is completed so as to give the user a time equal to or greater than the turn prepare time before the next turn maneuver.

3. A method of recalculating a route to a destination as defined in claim 1, wherein the step of predicting the path includes a step of comparing angles formed by the road segments.

4. A method of recalculating a route to a destination as defined in claim 1, wherein the step of predicting the path includes a step of comparing road names assigned to the road segments.

5. A method of recalculating a route to a destination as defined in claim 1, wherein the step of predicting the path includes a step of comparing function classes of the road segments.

6. A method of recalculating a route to a destination as defined in claim 1 wherein the estimated calculation time is a predefined value set by a manufacturer or a value that is obtained by an experimental calculation operation.

7. A method of recalculating a route to a destination as defined in claim 1, wherein the estimated calculation time is renewed by a value obtained by an experimental calculation operation or a value obtained by an actual route calculation operation.

8. A method of recalculating a route to a destination as defined in claim 1, wherein a value for the turn prepare time is adjustable by the user.

9. An apparatus for calculating a route to a destination, comprising:
   detection means for detecting whether a user has deviated from an originally calculated route to a destination;
   prediction means for predicting a path that a user is likely to take after the user has deviated from the original route until a new route to the destination is calculated by examining data regarding road segments retrieved from a map data storage;
   calculation means for calculating a predicted distance that the user advances through the predicted path during a time the new route to the destination is calculated and a turn prepare time, thereby determining a start position of a new route to the destination; and
   calculation means for calculating a new route to the destination incorporating the start position so that the new route allows the user a sufficient time for next turn maneuver while enabling to quickly reach the destinations;
   wherein the predicted distance is calculated by the following formula:

$$D=(ECT+TPT)*AVS$$

where D denotes the predicted distance, ECT denotes an estimated calculation time which is a time required for producing a new calculated route to the destination, TPT denotes a turn prepare time which is a time length appropriate for the user to prepare for turning at a next intersection, and AVS denotes an average vehicle speed.

10. An apparatus for recalculating a route to a destination as defined in claim 9, further comprising start means for starting route guidance for the new route as soon as the calculation for the new route is completed so as to give the user a time equal to or greater than the turn prepare time before the next turn maneuver.

11. An apparatus for recalculating a route to a destination as defined in claim 9, wherein said prediction means for predicting the path includes comparison means for comparing angles formed by the road segments.

12. An apparatus for recalculating a route to a destination as defined in claim 9, wherein said prediction means for predicting the path includes comparison means for comparing road names assigned to the road segments.

13. An apparatus for recalculating a route to a destination as defined in claim 9, wherein said prediction means for predicting the path includes comparison means for comparing function classes of the road segments.

14. An apparatus for recalculating a route to a destination as defined in claim 9, wherein the estimated calculation time is a predefined value set by a manufacturer or a value that is obtained by an experimental calculation operation.

15. An apparatus for recalculating a route to a destination as defined in claim 9, wherein the estimated calculation time is renewed by a value obtained by an experimental calculation operation or a value obtained by an actual route calculation operation.

16. An apparatus for recalculating a route to a destination as defined in claim 9, wherein a value for the turn prepare time is adjustable by the user.

* * * * *